(12) United States Patent
Garcia et al.

(10) Patent No.: US 9,798,214 B2
(45) Date of Patent: Oct. 24, 2017

(54) METHODS OF CHARGING SOLID STATE PLASMONIC ELECTROCHROMIC SMART WINDOW DEVICES

(71) Applicant: HELIOTROPE TECHNOLOGIES, INC., Alameda, CA (US)

(72) Inventors: Guillermo Garcia, Oakland, CA (US); Jason Holt, Larkspur, CA (US); Evelyn Rosen, Berkeley, CA (US); Brett Helms, San Francisco, CA (US)

(73) Assignee: HELIOTROPE TECHNOLOGIES INC., Alameda, CA (US)

( * ) Notice: Subject to any disclaimer, the term of this patent is extended or adjusted under 35 U.S.C. 154(b) by 0 days.

(21) Appl. No.: 15/045,884

(22) Filed: Feb. 17, 2016

(65) Prior Publication Data

US 2016/0246153 A1    Aug. 25, 2016

Related U.S. Application Data

(60) Provisional application No. 62/118,167, filed on Feb. 19, 2015.

(51) Int. Cl.
*G02F 1/161*  (2006.01)
*G02F 1/163*  (2006.01)
*G09G 3/38*   (2006.01)
*G02F 1/15*   (2006.01)
*G02F 1/153*  (2006.01)
(Continued)

(52) U.S. Cl.
CPC ............... *G02F 1/163* (2013.01); *G02F 1/155* (2013.01); *G02F 1/1525* (2013.01); *G02F 1/1533* (2013.01); *G02F 1/161* (2013.01); *G09G 3/38* (2013.01); *G02F 2001/1502* (2013.01); *G02F 2001/1519* (2013.01); *G02F 2001/1536* (2013.01); *G02F 2201/086* (2013.01);
(Continued)

(58) Field of Classification Search
CPC . G02F 1/03; G02F 1/15; G02F 1/1525; G02F 1/1533; G02F 1/155; G02F 1/161; G02F 1/163; G02F 2001/1502; G02F 2001/1519; G02F 2001/1536; G02F 2001/1555; G02F 2001/1557; G02F 2201/086; G02F 2202/36; G02F 2203/01; G02F 2203/02; G02F 2203/10; G02F 2203/11; G02B 26/00; G09G 3/34; G09G 3/38; B82Y 30/00
USPC ....... 359/252, 265, 266, 270, 273, 275, 296; 345/105, 107; 348/302; 250/208.1
See application file for complete search history.

(56) References Cited

U.S. PATENT DOCUMENTS 3,973,829 A    8/1976  Giglia
4,120,568 A   10/1978  Deb et al.
(Continued)

OTHER PUBLICATIONS

International Search Report and the Written Opinion of the International Searching Authority for International Application No. PCT/US2016/018256, dated Jul. 20, 2016, 17 pages.
(Continued)

*Primary Examiner* — Loha Ben
(74) *Attorney, Agent, or Firm* — The Marbury Law Group PLLC

(57) ABSTRACT

Methods of charging an electrochromic device includes post assembly charging using a sacrificial redox agent, lithium diffusion into an electrode from a lithium layer or salt bridge charging, or pre assembly charging using proton photoinjection into an electrode.

25 Claims, 6 Drawing Sheets

(51) Int. Cl.
*G02F 1/155* (2006.01)
*G09G 3/34* (2006.01)

(52) U.S. Cl.
CPC ...... *G02F 2202/36* (2013.01); *G02F 2203/10* (2013.01); *G02F 2203/11* (2013.01); *G09G 3/34* (2013.01)

(56) References Cited

U.S. PATENT DOCUMENTS

| | | | | |
|---|---|---|---|---|
| 4,325,611 | A | 4/1982 | Huggins et al. | |
| 5,157,540 | A * | 10/1992 | Kidai | G02F 1/1523 359/267 |
| 5,442,478 | A * | 8/1995 | Lampert | G02F 1/1525 359/273 |
| 6,645,675 | B1 * | 11/2003 | Munshi | H01B 1/122 252/62.2 |
| 7,054,050 | B2 * | 5/2006 | Vincent | G02F 1/155 359/268 |
| 7,586,663 | B1 * | 9/2009 | Radmard | G02F 1/15 345/105 |
| 7,605,390 | B2 * | 10/2009 | Chen | B82Y 20/00 257/17 |
| 7,679,110 | B2 * | 3/2010 | Armgarth | B82Y 10/00 257/253 |
| 7,897,030 | B2 * | 3/2011 | Suh | B82Y 30/00 205/688 |
| 8,101,061 | B2 * | 1/2012 | Suh | B82Y 30/00 205/414 |
| 2006/0087714 | A1 | 4/2006 | Weng | |

OTHER PUBLICATIONS

Garcia, G. et al., "Dynamically Modulating the Surface Plasmon Resonance of Doped Semiconductor Nanocrystals," Nano Lett. 2011, vol. 11, pp. 4415-4420, (2011).

Forney, M. W. et al., "Prelithiation of Silicon-Carbon Nanotube Anodes for Lithium Ion Batteries by Stabilized Lithium Metal Powder (SLMP)," Nano Lett. 2013, vol. 13, pp. 4158-4163, (2013).

Gavrilyuk, A., "Photochromism in WO3 Thin Films," Ioffe Physical Technical Institute, Electrochimica Acta, vol. 44, pp. 3027-3037, (1999).

Garcia, G. et al., "Near-Infrared Spectrally Selective Plasmonic Electrochromic Thin Films," Adv. Optical Mater. 2013, vol. 1, pp. 215-220, (2013).

Williams, T. E. et al., "NIR-Selective electrochromic heteromaterial frameworks: a platform to understand mesoscale transport phenomena in solid-state electrochemical devices," J. Mater. Chem. C, 2014, vol. 2, pp. 3328-3335, (2014).

Advancement of Electrochromic Windows, PIER Final Project Report, California Energy Commission, CEC-500-2006-052, pp. 1-87, (2006).

Mattox, T. M. et al., "Influence of Shape on the Surface Plasmon Resonance of Tungsten Bronze Nanocrystals," Chem. Mater. 2014, vol. 26, pp. 1779-1784, (2014).

Llordes, A. et al., "Tunable near-infrared and visible-light transmittance in nanocrystal-in-glass composites," Nature, vol. 500, pp. 323-326, (2013).

Apte, J. et al., "Future Advanced Windows for Zero-Energy Homes," KC-03-12-03, ASHRAE Transactions: Symposia, vol. 109, Part 2, pp. 871-882, (2003).

* cited by examiner

METHODS OF CHARGING SOLID STATE PLASMONIC ELECTROCHROMIC SMART WINDOW DEVICES

The present application is related to and claims priority to U.S. Provisional Application No. 62/118,167, filed Feb. 19, 2015, the entire contents of which are incorporated by reference herein.

FIELD

The present invention is generally directed to electrochromic devices, and more particularly to the selectively modulating transmittance of radiation as a function of voltage applied to a nanostructured material in an electrochromic device.

BACKGROUND

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. An electrochromic window coating overcomes these limitations by enhancing the window performance in all climates. Electrochromic window coatings undergo a reversible change in optical properties when driven by an applied potential. Traditional electrochromic materials, such as $WO_3$, $Nb_2O_5$, and NiO, primarily modulate radiation in the visible spectral region, while radiation in the near-infrared (NIR) spectral region remains either unchanged or switches simultaneously with visible region of light. Further, performance of electrochromic materials may degrade from use over time as a result of repeated exposure to radiation in the ultraviolet (UV) spectral region.

SUMMARY

An embodiment includes a method of forming an electrochromic device comprising providing a first electrode and a second electrode, wherein the first and second electrodes are neutrally-charged, assembling a sealed electrochemical cell of the electrochromic device containing the first and second electrodes and a solid state electrolyte disposed between the first and second electrodes, and generating a charge in at least one of the first and second electrodes after the step of assembling.

Another embodiment includes a method of charging an electrochromic device, comprising providing an electrochemical cell of the electrochromic device containing first and second electrodes and a solid state electrolyte comprising a polymer and a sacrificial redox agent (SRA) disposed between the first and second electrodes, and applying a bias to the electrochemical cell, such that molecules of the SRA are oxidized near an interface with the first electrode to release protons and electrons, wherein the electrons generated from the oxidation of the SRA molecules are provided through a circuit between the first and the second electrodes to reduce the second electrode.

Another embodiment includes a method of forming an electrochromic device, comprising providing a first electrode and a second electrode, charging at least one of the first and second electrodes using proton photoinjection, and assembling a sealed electrochemical cell of the electrochromic device containing the first and second electrodes and a solid state electrolyte disposed between the first and second electrodes after the step of charging.

DETAILED DESCRIPTION OF THE EMBODIMENTS

Figure 1A:
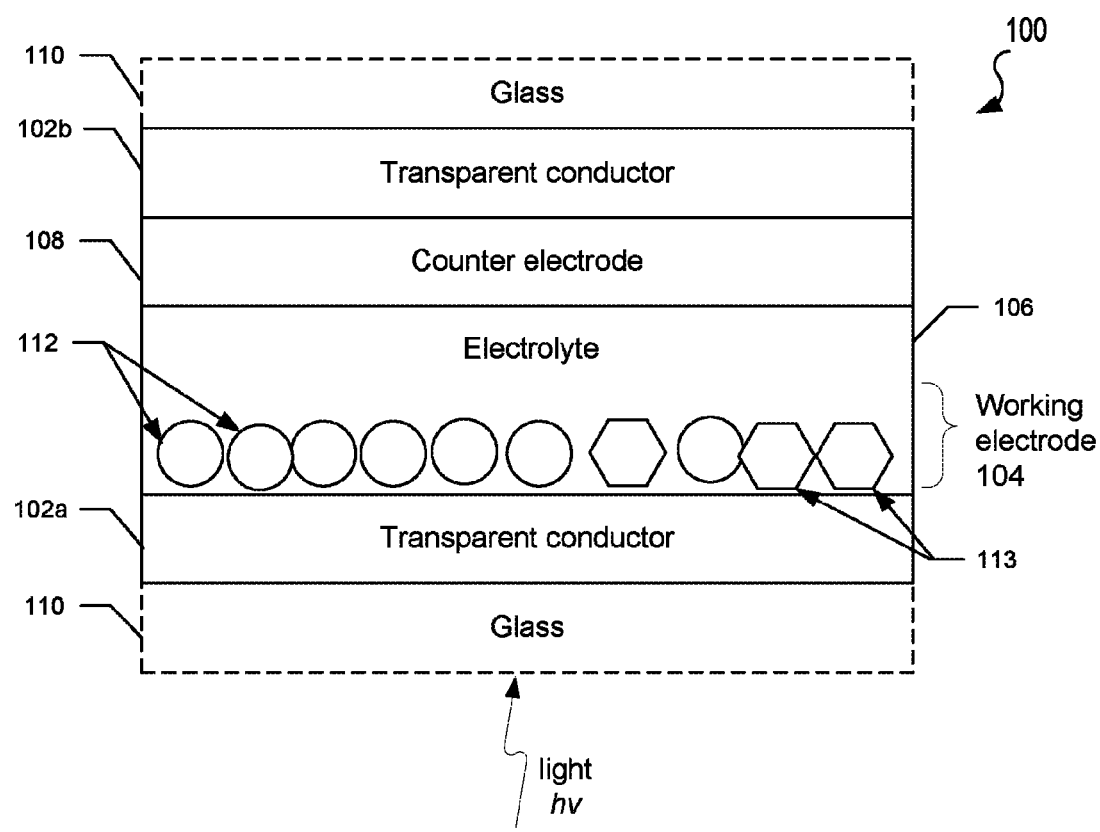
FIGS. 1A-1C are schematic representations of electrochromic devices according to various embodiments.

Single-component electrochromic nanostructured materials capable of selectively modulating NIR and visible spectral regions have been developed for use in electrochromic devices. In particular, electrochromic nanostructured materials, which can undergo a reversible change in optical properties when driven by an applied potential, may be fabricated into an electrode to form an electrochromic device. When incorporated in a window assembly, these electrochromic devices can dynamically optimize solar gain and occupant comfort within a building by varying solar transmittance in response to changing weather conditions and preferences.

The various selectively modulating electrochromic devices may include a working electrode including transparent conducting oxide nanoparticles and a nanostructured transition metal oxide bronze layer, a solid state electrolyte, and a counter electrode including a nanostructured material that is optically passive to NIR and visible radiation during modulation.

Typically, nanostructured materials in the electrodes are fabricated from organic solutions through ligand exchange. Specifically, initial nanoparticles are dispersed in organic solvents, but may be converted to stable aqueous solutions which enable the nanoparticles to be incorporated into the electrodes in a cost-effective manufacturing process. Since such process renders the electrodes neutral in charge, and electrochromic device operation requires the availability of ions and electrons, either one or both of the electrodes are typically charged before device assembly, such as by a lithium bath charging process in which an electrode is submerged in a liquid electrolyte bath with a lithium metal reference electrode. A lithium bath charging process further includes applying an appropriate potential to reduce the electrode, removing the charged electrode from the electrolyte bath, rinsing the charged electrode, and assembling a device that includes the charged electrode with a polymer electrolyte and another electrode. However, lithium bath charging uses large volumes of non-aqueous solvents and long charging times, thereby increasing the manufacturing costs substantially. Accordingly, alternative charging mechanisms are desirable.

An embodiment of the invention provides improved charging processes for electrochromic devices, such as devices containing nanostructured material electrodes capable of selectively modulating radiation in near-infrared (NIR) and visible spectral regions. Specifically, various embodiments may to improve the manufacture of EC window coatings by enabling charging of the electrodes in a manner that is easier than the traditional lithium bath charging process, given the gel polymer state of the electrolyte used in various embodiments.

The various embodiments provide devices and methods for charging devices containing electrochromic nanostructured materials fabricated into an electrode to form an electrochromic device, such as a smart window coating for a building structure or vehicle. In various embodiments, the material may undergo a reversible change in optical properties when driven by an applied potential. Based on the applied potential, the electrochromic nanostructured materials may modulate NIR radiation (wavelength of around 780-2500 nm), as well as visible radiation (wavelength of around 400-780 nm). In an example, the device may include a first nanostructured material that modulates radiation in a portion of the NIR spectral region and in the visible spectral region, and a second nanostructured material that modulates radiation in an overlapping portion of the NIR spectral region such that the NIR radiation modulated by the device as a whole is enhanced and expanded relative to that of just the first nanostructured material. In various embodiments, the material may operate in multiple selective modes based on the applied potential.

Further, the various embodiments may include at least one protective material to prevent or reduce damage to an electrochromic nanostructured material that may result from repeated exposure to radiation in the UV spectral region. In an example, a protective material may be used to form at least one barrier layer in the device that is positioned to block UV radiation from reaching the first nanostructured material and electrolyte. In another example, a protective material may be used to form a layer that is positioned to block free electron charge carriers created in the electrolyte due to absorption of UV radiation by the electrolyte from migrating to the nanostructured materials, while allowing diffusion of ions from the electrolyte (i.e., an electron barrier and ion conductor).

In various embodiments, control of individual operating modes for modulating absorption/transmittance of radiation in specific spectral regions may occur at different applied biases. Such control may provide users with the capability to achieve thermal management within buildings and other enclosures (e.g., vehicles, etc.), while still providing shading when desired.

Figure 1B:
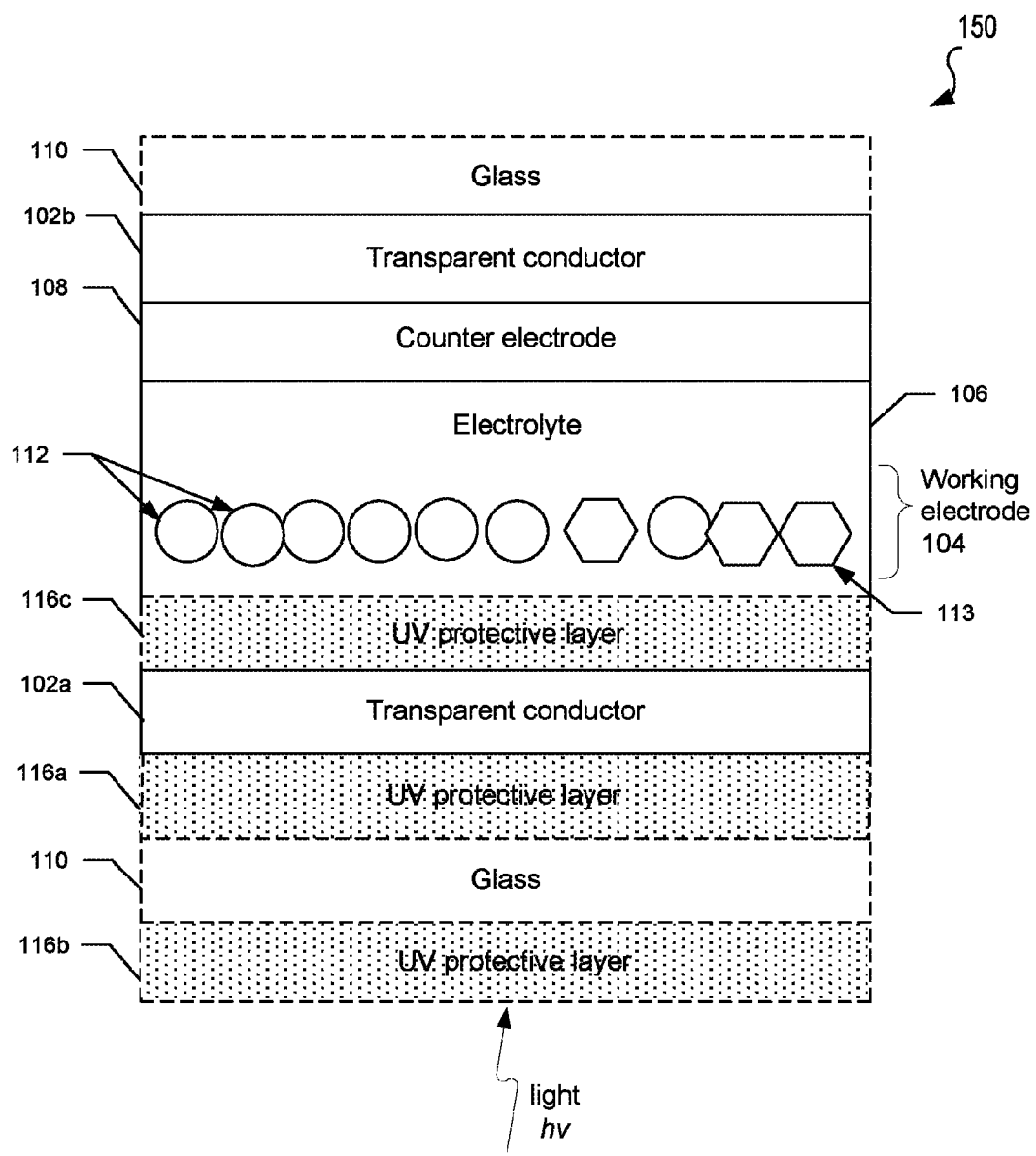
Figure 1C:
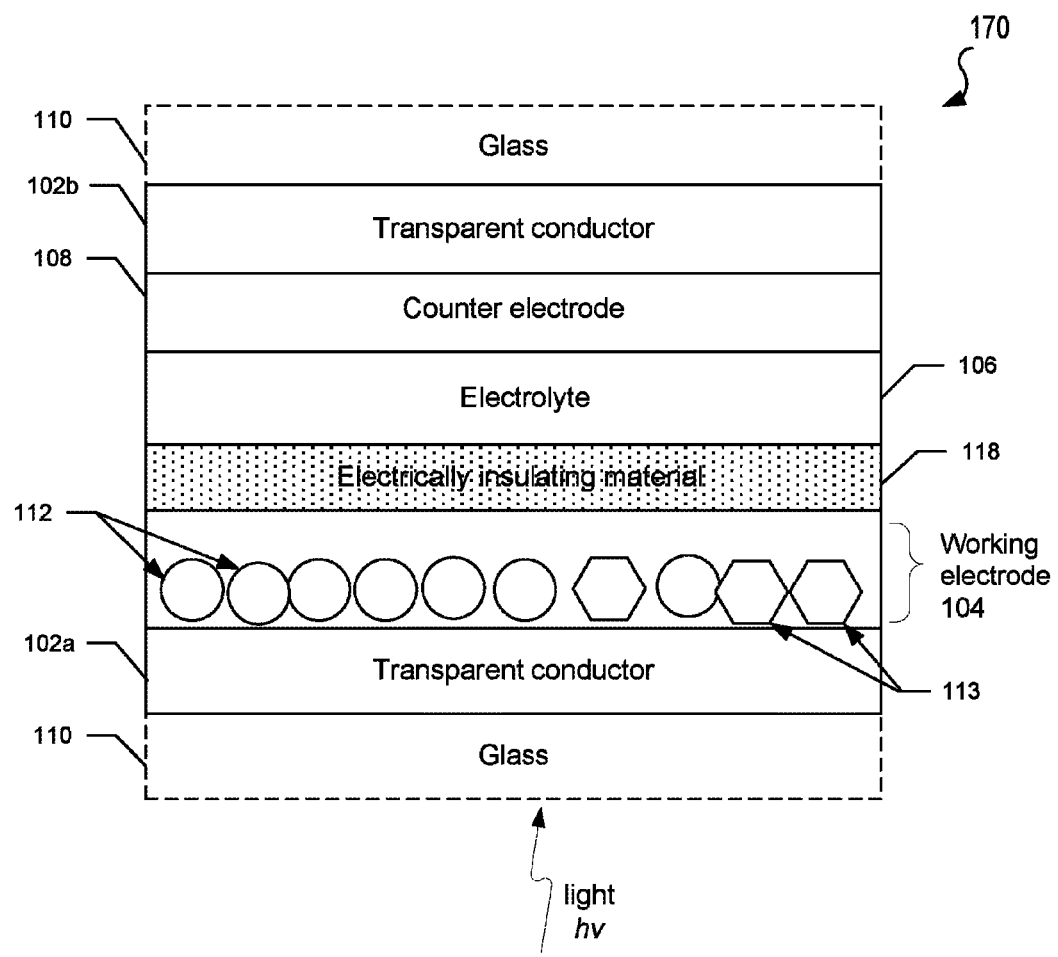

FIGS. 1A-1C illustrate embodiments of electrochromic devices. It should be noted that such electrochromic devices may be oriented upside down or sideways from the orientations illustrated in FIGS. 1A-1C. Furthermore, the thickness of the layers and/or size of the components of the devices in FIGS. 1A-1C are not drawn to scale or in actual proportion to one another other, but rather are shown as representations.

In FIG. 1A, an embodiment of an electrochromic device 100 may include a first transparent conductor layer 102a, a working electrode 104, a solid state electrolyte 106, a counter electrode 108, and a second transparent conductor layer 102b. Some embodiment electrochromic devices may also include one or more optically transparent support layer, such as plastic or glass layer 110 positioned in front of the first transparent conductor layer 102a and/or positioned behind the second transparent conductor layer 102b.

The first and second transparent conductor layers 102a, 102b may be formed from transparent conducting films fabricated using inorganic and/or organic materials. For example, the transparent conductor layers 102a, 102b may include inorganic films of transparent conducting oxide (TCO) materials, such as indium tin oxide (ITO) or fluorine doped tin oxide (FTO). In other examples, organic films in transparent conductor layers 102a, 102b may include graphene and/or various polymers.

In the various embodiments, the working electrode 104 may include one or more nanostructures, such as nanostructures 112 of a doped transition metal oxide bronze, and optionally additional nanostructures 113 of a transparent conducting oxide (TCO) composition shown schematically as circles and hexagons for illustration purposes only. As discussed above, the thickness of the layers of the device 100, including and the shape, size and scale of nanostructures is not drawn to scale or in actual proportion to each other, but is represented for clarity. In the various embodiments, nanostructures 112, 113 may be embedded in an optically transparent matrix material or provided as a packed or loose layer of nanostructures exposed to the electrolyte.

In the various embodiments, the doped transition metal oxide bronze of nanostructures 112 may be a ternary composition of the type AxMzOy, where A represents at least one dopant and M represents a metal, semimetal, and/or metalloid ion species, preferably a transition metal ion species in at least one transition metal oxide. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the nanostructured transition metal oxide bronze may include a plurality of tungsten oxide ($WO_{3-x}$) nanoparticles, where $0 \leq x \leq 0.33$, such as $0 \leq x \leq 0.1$.

In various embodiments, the at least one dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanostructure shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 106 and the nanostructured transition metal oxide bronze of the working electrode 104 as a result of the applied voltage. Specifically, the application of voltage within the particular range may cause the second dopant species to intercalate and deintercalate the transition metal oxide structure. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species.

In various embodiments, the optional nanostructures 113 may be mixed with the doped transition metal oxide bronze nanostructures 112 in the working electrode 104. In the various embodiments, the nanostructures 113 may include at least one TCO composition, which prevents UV radiation from reaching the electrolyte and generating electrons. In an example embodiment, the nanostructures 113 may include an indium tin oxide (ITO) composition, which may be a solid solution of around 60-95 wt % (e.g., 85-90 wt %) indium(III) oxide ($In_2O_3$) and around 5-40 wt % (e.g., 10-15 wt %) tin(IV) oxide ($SnO_2$). In another example embodiment, the nanostructures 113 may include an aluminum-doped zinc oxide (AZO) composition, which may be a solid solution of around 99 wt % zinc oxide (ZnO) and around 2 wt % aluminum(III) oxide ($Al_2O_3$). Additional or alternative TCO compositions that may be used to form nanostructures 113 in the various embodiments include, but are not limited to, indium oxide, zinc oxide and other doped zinc oxides such as gallium-doped zinc oxide and indium-doped zinc oxide.

The TCO composition of nanostructures 113 may be transparent to visible light and, upon application of the first voltage, may modulate absorption of NIR radiation at wavelengths of around 1200-2500 nm, with peak absorbance around 2000 nm (e.g., at a longer peak wavelength than the bronze nanoparticles 112, but with overlapping absorption bands). In particular, application of the first voltage may cause an increase in free electron charge carriers, and therefore cause a surface plasmon resonance effect in at least one TCO composition of nanostructures 113. In an embodiment in which the TCO composition is ITO, the surface plasmon resonance effect may be caused by oscillation of free electrons produced by the replacement of indium ions ($In^{3+}$) with tin ions ($Sn^{4+}$). Similar to the transition metal oxide bronze, such surface plasmon resonance may cause a change in absorption properties of the TCO material. In some embodiments, the change in absorption properties may be an increase in absorbance of NIR radiation at wavelengths that overlaps with that of the nanostructures 112. Therefore, the addition of TCO composition nanostructures 113 to the working electrode 104 may serve to expand the range of NIR radiation absorbed (e.g., at wavelengths of around 780-2500 nm) compared to that of the nanostructures 112 alone (e.g., at wavelengths of around 780-2000 nm), and to enhance absorption of some of that NIR radiation (e.g., at wavelengths of around 1200-2000 nm).

Based on these optical effects, the nanostructures 112, 113 of the working electrode may progressively modulate transmittance of NIR and visible radiation as a function of applied voltage by operating in at least three different modes. For example, a first mode may be a highly solar transparent ("bright") mode in which the working electrode 104 is transparent to NIR radiation and visible light radiation. A second mode may be a selective-IR blocking ("cool") mode in which the working electrode 104 is transparent to visible light radiation but absorbs NIR radiation. A third mode may be a visible blocking ("dark") mode in which the working electrode 104 absorbs radiation in the visible spectral region and at least a portion of the NIR spectral region. In an example, application of a first voltage having a negative bias may cause the electrochromic device to operate in the cool mode, blocking transmittance of NIR radiation at wavelengths of around 780-2500 nm. In another example, application of a second negative bias voltage having a higher absolute value than the first voltage may cause the electrochromic device to operate in the dark state, blocking transmittance of visible radiation (e.g., at wavelengths of around 400-780 nm) and NIR radiation at wavelengths of around 780-1200 nm. In another example, application of a third voltage having a positive bias may cause the electrochromic device to operate in the bright state, allowing transmittance of radiation in both the visible and NIR spectral regions. In various embodiments, the applied voltage may be between −5V and +5V, preferably between −2V and +2V. For example, the first voltage may be −0.25V to −0.75V, and the second voltage may be −1V to −2V. In another example, the absorbance of radiation at a wavelength of 800-1500 nm by the electrochromic device may be at least 50% greater than its absorbance of radiation at a wavelength of 450-600 nm.

In various embodiments, the solid state electrolyte 106 may include at least a polymer material and a plasticizer material, such that electrolyte may permeate into crevices between the transition metal oxide bronze nanoparticles 112 (and/or nanoparticles 113 if present). The term "solid state," as used herein with respect to the electrolyte 106, refers to a polymer-gel and/or any other non-liquid material. In some embodiments, the solid state electrolyte 106 may further include a salt containing, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, such salt in the solid state electrolyte 106 may contain a lithium and/or sodium ions. In some embodiments, the solid state electrolyte 106 may initially contain a solvent, such as butanol, which may be evaporated off once the electrochromic device is assembled. In some embodiments, the solid state electrolyte 106 may be around 40-60 wt % plasticizer material, preferably around 50-55 wt % plasticizer material. In an embodiment, the plasticizer material may include at least one of at least one of tetraglyme, an organic ether, and an organic alcohol. In an embodiment, the polymer material of the solid state electrolyte 106 may be polyvinylbutyral (PVB), and the salt may be lithium bis(trifluoromethane)) sulfonimide. In other embodiments, the solid state electrolyte 106 may include at least one of lithium phosphorus oxynitride (LiPON) and tantalum pentoxide ($Ta_2O_5$).

The counter electrode 108 of the various embodiments should be capable of storing enough charge to sufficiently balance the charge needed to cause visible tinting to the nanostructured transition metal oxide bronze in the working electrode 104. In various embodiments, the counter electrode 108 may be formed as a conventional, single component film, a nanostructured film, or a nanocomposite layer.

In some embodiments, the counter electrode 108 may be formed from at least one passive material that is optically transparent to both visible and NIR radiation during the applied biases. Examples of such passive counter electrode materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, and/or $V_2O_5$. In other embodiments the counter electrode 108 may be formed from at least one complementary material, which may be transparent to NIR radiation but which may be oxidized in response to application of a bias, thereby causing absorption of visible light radiation. Examples of such complementary counter electrode materials may include $Cr_2O_3$, $MnO_2$, $FeO_2$, $CoO_2$, $NiO_2$, $RhO_2$, or $IrO_2$. The counter electrode materials may include a mixture of one or more passive materials and/or one or more complementary materials described above.

Without being bound to any particular theory, it is believed that the application of a first voltage in the various embodiments may cause the interstitial dopant species (e.g., cesium) in the crystal structure of the transition metal oxide bronze to have a greater amount of free carrier electrons and/or to cause the interstitial dopant species (e.g., lithium ions from the electrolyte) to perform non-faradaic capacitive or pseudo-capacitive charge transfer on the surface of the nanostructures 112, which may cause the surface plasmon resonance effect to increase the absorption of NIR radiation. In this manner, the absorption properties of the transition metal oxide bronze characteristics may change (i.e., increased absorption of NIR radiation) upon application of the first voltage. Further, application of a second voltage having a higher absolute value than the first voltage in the various embodiments may cause faradaic intercalation of an intercalation dopant species (e.g., lithium ions) from the electrolyte into the transition metal oxide nanostructures. It is believed that the interaction of this dopant species provides interstitial dopant atoms in the lattice which creates a polaron effect. In this manner, the lattice structure of transition metal oxide nanoparticles may experience a polaron-type shift, thereby altering its absorption characteristics (i.e., shift to visible radiation) to block both visible and near infrared radiation.

In some embodiments, in response to radiation of certain spectral regions, such as UV (e.g., at wavelengths of around 10-400 nm) may cause excitons to be generated in the polymer material of the solid state electrolyte 106. The UV radiation may also excite electrons in the doped transition metal oxide bronze to move into the conduction band, leaving holes in the valence band. The generated excitons in the polymer material may dissociate to free carriers, the electrons of which may be attracted to the holes in the valence band in the doped transition metal oxide bronze (e.g., cesium-doped tungsten trioxide ($Cs_xWO_3$)) of nanoparticles 112. Since electrochemical reduction of various transition metal oxide bronzes by such free electron charge carriers may degrade their performance (i.e., from unwanted coloration of the transition metal oxide bronze), embodiment devices may include one or more layer of a protective material to prevent UV radiation from reaching the solid state electrolyte 106, in addition to or instead of nanostructures 113 mixed into the working electrode.

FIG. 1B illustrates an embodiment of an electrochromic device 150 that addresses degradation of the doped transition metal oxide bronze nanostructures 112. Similar to device 100 shown in FIG. 1A, device 150 may include a first transparent conductor layer 102a, a working electrode 104, a solid state electrolyte 106, a counter electrode 108, a second transparent conductor layer 102b, and one or more optically transparent support layer 110. In addition, device 150 may include one or more protective layers 116a-116c made of a material that absorbs UV radiation. In an example embodiment, the device 150 may include a first protective layer 116a positioned in front of the first transparent conductor layer 102a. For example, the first protective layer 116a may be positioned between the first transparent conductor layer 102a and, if present, the optically transparent support layer 110. Alternatively, if present, a first protective layer 116b may be positioned in front of the optically transparent support layer 110 (i.e., on the side of the conductor layer 102a or support layer 110 opposite from the working electrode 104). In another example embodiment, the device 150 may additionally or alternatively provide a second protective layer 116c that is positioned between the first transparent conductor layer 102a and the working electrode 104.

The UV radiation absorbing material of the one or more protective layers 116a-116c of the various embodiments may be any of a number of barrier films. For example, the one or more protective layers 116a-116c may be a thin film of at least one TCO material, which may include a same as or different from TCO compositions in the nanostructures 113. In an example embodiment, a protective layer 116a of the device 150 may be an ITO thin film, and therefore capable of absorbing UV radiation by band-to-band absorption (i.e., absorption of a UV photon providing enough energy to excite an electron from the valence band to the conduction band). In another example embodiment, the device may include the TCO nanostructures 113 made of ITO, as well as a protective layer 116a composed of an ITO thin film. Alternatively, the TCO nanostructures 113 may form a separate thin film layer 116c disposed between the transition metal oxide bronze nanoparticles 112 and the transparent conductor 102a. In some embodiments, the UV radiation absorbing materials of protective layers 116a-116c may include organic or inorganic laminates.

In another embodiment, at least one UV protective layer, such as protective layer 116b in FIG. 1B, may be a UV radiation reflector made of a high index transparent metal oxide. Since birds can see radiation in the UV range, a UV reflector may be implemented in embodiments positioned as outside windows in order to prevent birds from hitting the windows. In some other embodiments, UV radiation absorbing organic molecules and/or inorganic UV radiation absorbing nanoparticles (e.g., zinc oxide, indium oxide, ITO, etc.) may be incorporated within the electrolyte 106 material.

FIG. 1C illustrates another embodiment of an electrochromic device 170 that addresses degradation of the doped transition metal oxide bronze nanostructures 112 by controlling the effects of the electron charge carriers generated in the electrolyte from exposure to UV radiation. Similar to devices 100 and 150 discussed above with respect to FIGS. 1A and 1B respectively, device 170 may include a first transparent conductor layer 102a, a working electrode 104, a solid state electrolyte 106, a counter electrode 108, a second transparent conductor layer 102b, and one or more optically transparent support layer 110. In addition, device 170 may include a protective layer 118 positioned between the working electrode 104 and the electrolyte 106. The protective layer 118 may be composed of one or more ionically conductive and electrically insulating material.

As discussed above, without being bound to any particular theory, it is believed that the migration of intercalation ions between the electrolyte 106 and the working electrode 104 is responsible for at least some of the device's capability to modulate spectral absorption. Therefore, in order to maintain operability of the device, the electrically insulating material used to form the protective layer 118 should also be ionically conductive. That is, the material of the protective layer 118 may prevent or reduce free electrons in the solid state electrolyte layer 106 from reducing the transition oxide bronze of nanoparticles 112, while allowing the diffusion of ions of an intercalation dopant species (e.g., Na, Li, etc.) between the electrolyte 106 and working electrode 104. In an example embodiment, the electrically insulating material that makes up the protective layer 118 may be tantalum oxide, such as tantalum pentoxide ($Ta_2O_5$), which blocks migration of electrons from the electrolyte 106 while allowing diffusion of the intercalation dopant species ions (e.g., lithium ions) from the electrolyte 106. In this manner, degradation of the transition metal oxide bronze is reduced or prevented by controlling the effect of the absorbed UV radiation in addition to or instead of instead of blocking its absorption. Other example materials that may be used to form the protective layer 118 in addition to or instead of tantalum pentoxide may include, without limitation, strontium titanate ($SrTiO_3$), zirconium dioxide ($ZrO_2$), indium oxide, zinc oxide, tantalum carbide, niobium oxide, and various other dielectric ceramics having similar electrical and/or crystalline properties to tantalum pentoxide.

In an alternative embodiment, instead of or in addition to the protective layer 118, the nanostructures 112 may each be encapsulated in a shell containing an electrically insulating and ionically conductive material, which may be the same as or different from the material of the protective layer 118 (e.g., tantalum oxide, strontium titanate, zinc oxide, indium oxide, zirconium oxide, tantalum carbide, or niobium oxide).

In an example embodiment, each nanostructure 112 may have a core of cubic or hexagonal unit cell lattice structure tungsten bronze, surrounded by a shell of tantalum pentoxide.

In some embodiments, the electrolyte 106 may include a polymer that reduces damage to the device due to UV radiation. The polymer may be any of a number of polymers that are stable upon absorption of UV radiation (e.g., no creation of proton/electron pairs). Examples of such polymers may include, but are not limited to, fluorinated polymers without hydroxyl (—OH) groups (e.g., polyvinylidene difluoride (PVDF)).

In another embodiment, a positive bias may be applied to the counter electrode 108 to draw UV radiation generated electrons from the electrolyte 106 to the counter electrode 108 in order to reduce or prevent electrons from the electrolyte 106 from moving to the working electrode 104 to avoid the free electron-caused coloration of the doped transition metal oxide bronze in the working electrode 104.

In another embodiment, a device may include more than one of, such as any two of, any three of, or all four of: (i) a protective layer of electrically insulating material (e.g., protective layer 118 or protective material shells around the bronze nanoparticles), (ii) one or more protective layer of UV radiation absorbing material (e.g., protective layer(s) 116a, 116b, and/or 116c in FIG. 1B, and/or UV radiation absorbing organic molecules and/or inorganic UV radiation absorbing nanoparticles incorporated within the electrolyte 106 material), (iii) electrolyte polymer that is stable upon absorption of UV radiation, and/or (iv) application of positive bias to the counter electrode 108. In various embodiments, the nanostructures 113 may be included in or omitted from electrochromic devices 150, 170.

In another embodiment, the protective layer(s) 116a, 116b, and/or 116c may comprise a stack of metal oxide layers. Alternatively, the stack may comprise a separate component that is provided instead of or in addition to the layer(s) 116a, 116b and/or 116c. The stack may provide improvement in the reflected color of the electrochromic device. Prior art devices generally have a reddish/purplish color when viewed in reflection. The stack may comprise index-matched layers between the glass and transparent conductive oxide layer to avoid the reddish/purplish reflected color. As noted above, the index-matched layer can serve as the UV absorber or be used in addition to another UV absorber. The stack may comprise a zinc oxide based layer (e.g., ZnO or AZO) beneath an indium oxide based layer (e.g., indium oxide or ITO).

Compared to nanocomposite electrochromic films, the various embodiments may involve similar production by utilizing a single nanostructured material in the working electrode to achieve the desired spectral absorption control in both NIR and visible regions, and another nanostructured material to enhance and expand such control in the NIR region. Further, the various embodiments may provide one or more additional layer(s) of a protective material to minimize degradation of the single nanostructured material.

In some embodiments, the working electrode and/or the counter electrode may additionally include at least one material, such as an amorphous nanostructured material, that enhances spectral absorption in the lower wavelength range of the visible region. In some embodiments, the at least one amorphous nanostructured material may be at least one nanostructured amorphous transition metal oxide.

In particular, the amorphous nanostructured materials may provide color balancing to the visible light absorption that may occur due to the polaron-type shift in the spectral absorption of the doped-transition metal oxide bronze. As discussed above, upon application of the second voltage having a higher absolute value, the transition metal oxide bronze may block (i.e., absorb) radiation in the visible range. In various embodiments, the absorbed visible radiation may have wavelengths in the upper visible wavelength range (e.g., 500-700 nm), which may cause the darkened layer to appear blue/violet corresponding to the un-absorbed lower visible wavelength range (e.g., around 400-500 nm). In various embodiments, upon application of the second voltage, the at least one nanostructured amorphous transition metal oxide may absorb complementary visible radiation in the lower visible wavelength range (e.g., 400-500 nm), thereby providing a more even and complete darkening across the visible spectrum with application of the second voltage. That is, use of the amorphous nanostructured material may cause the darkened layer to appear black.

In some embodiments, at least one nanostructured amorphous transition metal oxide may be included in the working electrode 104 in addition to the doped-transition metal oxide bronze nanostructures 112 and the TCO nanostructures 113. An example of such material in the working electrode 104 may be, but is not limited to, nanostructured amorphous niobium oxide, such as niobium(II) monoxide (NbO) or other niobium oxide materials (e.g., $NbO_x$). In some embodiments, the counter electrode 108 may include, as a complementary material, at least one nanostructured amorphous transition metal oxide. That is, in addition to optically passive materials, the counter electrode 108 may include at least one material for color balancing (i.e., complementing) the visible radiation absorbed in the working electrode (i.e., by the transition metal oxide bronze. An example of such material in the counter electrode 108 may be, but is not limited to, nanostructured amorphous nickel oxide, such as nickel(II) oxide (NiO), or other nickel oxide materials (e.g., $NiO_x$). Examples of other such nickel oxide materials may include, but are not limited to, nickel oxyhydroxide (NiOOH), nickel(III) oxide ($Ni_2O_3$), etc.

In the various embodiments, nanostructures that form the working and/or counter electrode, including the at least one amorphous nanostructured material, may be mixed together in a single layer. An example of a mixed layer is shown in FIG. 1A with respect to transition metal oxide bronze nanostructures 112 and TCO nanostructures 113. Alternatively, nanostructures that form the working and/or counter electrode, including the at least one amorphous nanostructured material, may be separately layered according to composition. For example, a working electrode may include a layer of amorphous $NbO_x$ nanostructures, a layer of transition metal oxide bronze nanostructures, and a layer of ITO nanostructures, in any of a number of orders.

The nanostructured transition metal oxide bronzes that may be part of the working electrode 104 in various embodiment devices can be formed using any of a number of low cost solution process methodologies. For example, solutions of $Nb:TiO_2$ and $Cs_xWO_3$ may be synthesized using colloidal techniques. Compared to other synthetic methodologies, colloidal synthesis may offer a large amount of control over the nanostructure size, shape, and composition of the nanostructured transition metal oxide bronze. After deposition, a nanostructured transition metal oxide bronze material in the working electrode 104 may be subjected to a thermal post treatment in air to remove and cap ligands on the surface of the nanostructures.

In various embodiments, nanostructured amorphous transition metal oxide materials may be formed at room temperature from an emulsion and an ethoxide precursor. For example, procedures used to synthesize tantalum oxide nanoparticles that are described in "Large-scale synthesis of bioinert tantalum oxide nanoparticles for X-ray computed tomography imaging and bimodal image-guided sentinel lymph node mapping" by M H Oh et al. (J Am Chem Soc. 2011 Apr. 13; 133(14):5508-15), incorporated by reference herein, may be similarly used to synthesize amorphous transition metal oxide nanoparticles. For example, an overall synthetic process of creating the nanoparticle, as described in Oh et al., may be adopted from the microemulsion synthesis of silica nanoparticles. In such process, a mixture of cyclohexane, ethanol, surfactant, and a catalysis for the sol-gel reaction may be emulsified. The ethoxide precursor may be added to the emulsion, and uniform nanoparticles may be formed by a controlled-sol gel reaction in the reverse micelles at room temperature within around 5 minutes. The sol-gel reaction may be catalyzed, for example, by NaOH.

In some embodiments, the nanostructured amorphous transition metal oxide may be sintered at a temperature of at least 400° C. for at least 30 minutes, such as 400 to 600° C. for 30 to 120 minutes to form a porous web. In an example embodiment, the porous web may be included in a working electrode 104, with the tungsten bronze nanoparticles and ITO nanoparticles incorporated in/on the web. Alternatively, the sintering step may be omitted and the nanostructured amorphous transition metal oxide may remain in the device in the form of nanoparticles having amorphous structure. In this embodiment, the device containing the nanostructured amorphous transition metal oxide may include or may omit the protective layer(s) 116a-116c, and 118, the UV stable electrolyte polymer, and the application of positive bias to the counter electrode.

Electrochromic responses of prepared nanostructured transition metal oxide bronze materials (e.g., $Cs_xWO_3$, $Nb:TiO_2$, etc.) may be demonstrated by spectroelectrochemical measurements.

In various embodiments, the shape, size, and doping levels of nanostructured transition metal oxide bronzes may be tuned to further contribute to the spectral response by the device. For instance, the use of rod versus spherical nanostructures 112 may provide a wider level of porosity, which may enhance the switching kinetics. Further, a different range of dynamic plasmonic control may occur for nanostructures with multiple facets, such as at least 20 facets.

Various embodiments may also involve alternation of the nanostructures 112 that form the working electrode 104. For example, the nanostructures may be nanoparticles of various shapes, sizes and/or other characteristics that may influence the absorption of NIR and/or visible light radiation. In some embodiments, the nanostructures 112 may be isohedrons that have multiple facets, preferably at least 20 facets.

In some embodiments, the transition metal oxide bronze nanostructures 112 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 104. For example, the working electrode 104 may include both cubic and hexagonal cesium doped tungsten oxide bronze nanoparticles.

For example, upon application of the first (i.e., lower absolute value) voltage described above, the hexagonal bronze nanostructures 112 may block NIR radiation having wavelengths in the range of around 800-1700 nm, with the peak absorption at the mid-NIR wavelength of around 1100 nm. The cubic bronze nanostructures 112 may block NIR radiation having wavelengths in the close-NIR range with the peak absorption of around 890 nm. The indium oxide based (including ITO) and/or zinc oxide based (including AZO) nanostructures 113 may be included in the working electrode 104 to block the higher wavelength IR radiation upon application of the first voltage. Thus, the cubic bronze and hexagonal bronze nanostructures may block respective close and mid-NIR radiation (e.g., using the Plasmon effect), while the nanostructures 113 may block the higher wavelength IR radiation.

Upon application of the second (i.e., higher absolute value) voltage described above, the cubic bronze nanostructures 112 may block visible and NIR radiation having wavelengths in the range of around 500-1500 nm, with the peak absorption at the close-NIR wavelength of around 890 nm (e.g., using the polaron effect). Optionally, the amorphous niobium oxide may also be added to the working electrode 104 to block the short wavelength visible radiation (e.g., 400 to 500 nm wavelength).

The cubic bronze nanostructures block visible radiation via the polaron effect at a lower applied voltage than the hexagonal bronze nanostructures. Thus, the second voltage may have an absolute value which is below the value at which the hexagonal bronze nanostructures block visible radiation via the polaron effect such that these nanostructures do not contribute to blocking of visible radiation. Alternatively, the second voltage may have an absolute value which is above the value at which the hexagonal bronze nanostructures block visible radiation via the polaron effect such that these nanostructures also contribute to blocking of visible radiation.

Embodiment nanoparticles that form the working electrode 104 may be around 4-6 nm in diameter, and may include 40 to 70 wt %, such as around 50 wt % cubic tungsten bronze nanostructures, 15 to 35 wt %, such as around 25 wt % hexagonal tungsten bronze nanostructures, and optionally 15 to 35 wt %, such as around 25 wt % ITO nanostructures. In some embodiments, in order to achieve color balancing as described above, the nanoparticles that form the working electrode 104 may optionally include around 5-10 wt % amorphous NbO nanostructures in place of cubic tungsten bronze nanostructures. In this embodiment, the device containing two types of bronze nanoparticles may include or may omit the protective layer(s) 116a-116c, and 118, the UV stable electrolyte polymer, the application of positive bias to the counter electrode, and the amorphous niobium oxide.

In summary, the working electrode 104 may include one or more of the following components:
(a) metal oxide bronze nanostructures 112 having (i) a cubic or (ii) a combination of cubic and hexagonal unit cell lattice structure;
(b) protective (i) indium oxide based (including ITO) and/or zinc oxide based (including AZO) nanostructures 113;
(c) amorphous niobium oxide nanoparticles and/or web; and/or
(d) additional nanostructures selected from undoped tungsten oxide, molybdenum oxide, titanium oxide, and/or vanadium oxide.

The counter electrode 108 may include one or more of the following components:
(a) passive electrode material selected from cerium(IV) oxide ($CeO_2$), titanium dioxide ($TiO_2$), cerium(III) vanadate ($CeVO_2$), indium(III) oxide ($In_2O_3$), tin-doped indium oxide, tin(II) oxide ($SnO_2$), manganese-doped tin oxide, antimony-doped tin oxide, zinc oxide (ZnO), aluminum-doped zinc oxide (AZO), iron(III) oxide ($Fe_2O_3$), and vanadium(V) oxide ($V_2O_5$);
(b) an active electrode material selected from chromium (III) oxide ($Cr_2O_3$), manganese dioxide ($MnO_2$), iron (II) oxide (FeO), cobalt oxide (CoO), nickel(II) oxide (NiO), rhodium(IV) oxide ($RhO_2$), and iridium(IV) oxide ($IrO_2$);
(c) amorphous nickel oxide nanoparticles and/or web; and/or
(d) conductivity enhancer nanoparticles selected from indium oxide, ITO, and zinc oxide.

Figure 2A:
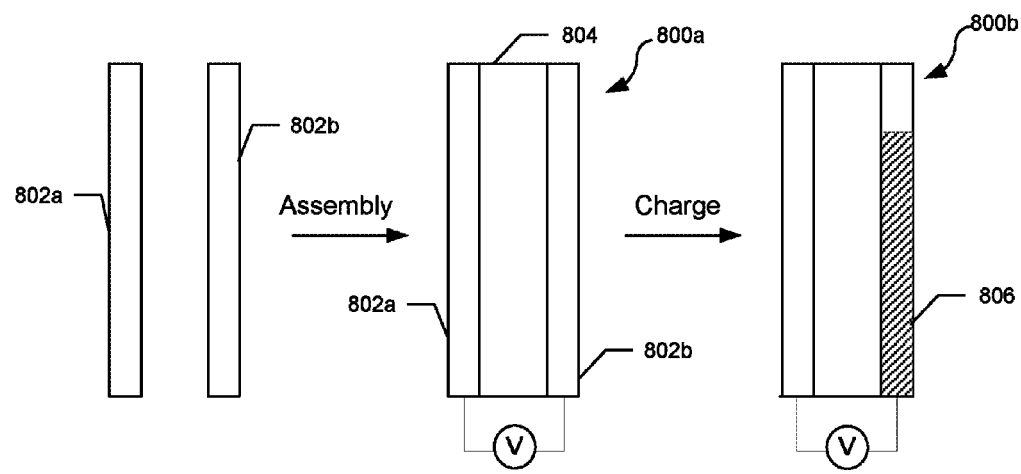
FIGS. 2A and 2B are schematic representations of charge generation processes according to various embodiments.
Figure 2B:
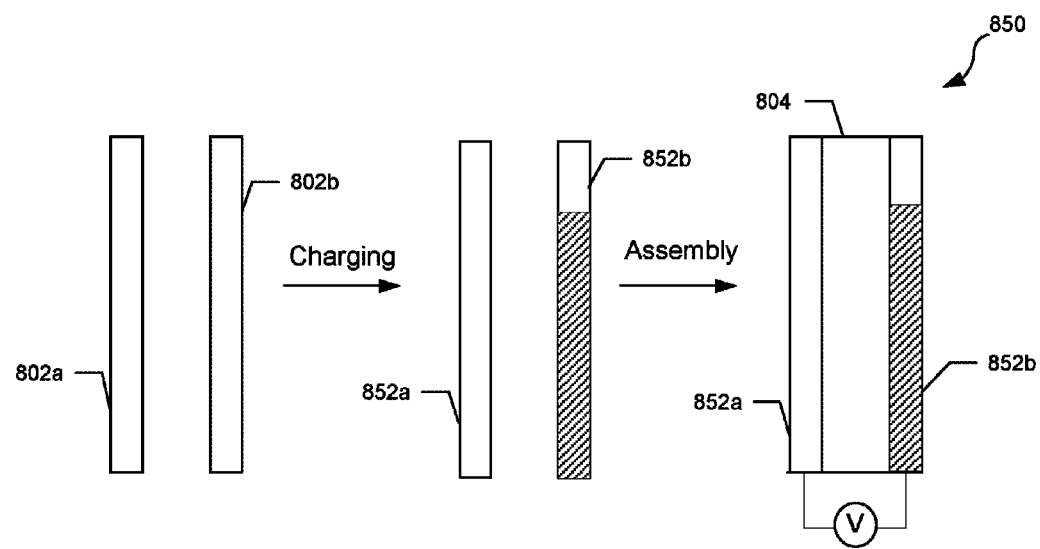

The embodiment methods of electrode charging may include post-assembly processes and pre-assembly processes, as schematically illustrated in FIGS. 2A and 2B. Specifically, in the various post-assembly embodiments, an electrochromic device 800a may be assembled with two neutral electrodes 802a, 802b and a solid state electrolyte 804. Charge may then be generated in one or more of the electrodes 802a, 802b of the assembled device 800a through various processes, thereby creating an operational electrochromic device 800b, as shown in FIG. 2A. While the electrochromic device 800b is shown with one charged electrode 806, in the various embodiments the charging may be reversed and/or applied to both electrodes 802a, 802b. In the various pre-assembly embodiments, charge may be generated in one or more of the neutral electrodes 802a, 802b, creating any of a number of configurations for charged electrodes 852a, 852b. For example, while FIG. 2B shows one neutral electrode 852a and one charged electrode 852b, the charging may be reversed and/or applied to both electrodes 852a and 852b. An operational electrochromic device 850 may be assembled containing a configuration of charged electrodes 852a, 852b and the solid state electrolyte 804. In various embodiments, both pre- and post-assembly charging processes may require generating a desired levels of charge density (typically 35 mC/cm$^2$ or higher for three-mode switching devices), and avoiding generating solid-electrolyte interphase layers or unsuitable byproducts such as gases that would have deleterious results on device performance.

Further, pre- and post-assembly charging processes in the various embodiments may be designed to maintain transparency in the bright state of the electrochromic device.

Post-Assembly Charging

In some embodiment post-assembly charging processes, a suitable sacrificial redox agent (SRA) may be added to a polymer electrolyte formulation that is used to create the solid state electrolyte in the assembly of the electrochromic device. Thus, in some embodiments, the assembled electrochromic device includes at least a working electrode (e.g., a nanostructured transition metal oxide bronze), a counter electrode (e.g., a TCO composition), and a solid state electrolyte containing a polymer electrolyte formulation and SRA.

In particular, such SRA-based post-assembly charging processes may include an assembly phase followed by an activation phase. In particular, in the assembly phase, neutral working and counter electrodes may be assembled with a polymer electrolyte formulation and SRA using standard procedures. In the activation phase, charge may be generated in one or more electrodes of the assembled device.

Assembly Phase

In various embodiments, the polymer electrolyte formulation to which the SRA molecules are added may contain a polymer, one or more plasticizer, and an alkali metal salt, such as a lithium salt. Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol etc.), other substituted benzyl alcohols, indoline, 1,2,3,4-tetrahydrocarbazole, N,N-dimethylaniline, 2,5-dihydroanisole, etc. In various embodiments, the SRA molecules may create an air stable layer that does not require an inert environment to maintain charge.

In the various embodiments, suitable SRAs may be selected based on characteristics including, for example, a high boiling point, a low electrochemical potential for oxidation (e.g., within the stability window of the electrolyte), and irreversible oxidation. Further, characteristics of suitable SRAs may include oxidation product(s) are stable upon exposure to UV radiation, are redox-inactive, are colorless, have a high boiling point, and do not include gaseous by-products. In some embodiments, a suitable SRA may be benzyl alcohol and/or benzyl alcohol derivatives. SRA molecules may be evaluated by cyclic voltammetry (CV) in standard half-cell configurations to determine their redox potentials.

Polymers that may be part of the polymer electrolyte formulation include, but are not limited to, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), etc. Plasticizers that may be part of the polymer electrolyte formulation include, but are not limited to, glymes (tetraglyme, triglyme, diglyme etc.), propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl) imide, etc.), N,N-dimethylacetamide, and mixtures thereof.

Lithium salts that may be part of the polymer electrolyte formulation include, but are not limited to, lithium bis(trifluoromethanesulfonyl) imide (LiTFSI), lithium perchlorate, lithium hexafluorophosphate, etc. In various embodiments, the concentration of the SRA added to the polymer electrolyte formulation may be less than or equal to 1.0 moles/liter (M) in the at least one plasticizer. The exact composition of the polymer electrolyte formulation may vary as optimized for a particular deposition technique (injection, extrusion, solvent-assisted slot-coating, etc.). Some example polymer electrolyte formulations containing an SRA may include, but are not limited to, Examples 1-4 in Table 1 below:

TABLE 1

|  | Example 1 | Example 2 | Example 3 | Example 4 | Preferred wt. % range |
|---|---|---|---|---|---|
| Polymer | 29 wt. % PMMA | 29 wt. % PMMA | 14 wt. % PMMA | 14 wt. % PMMA | 10-30 wt. % |
| Plasticizer(s) | 46 wt. % tetraglyme | 30 wt. % tetraglyme 16 wt. % 1-1-butyl-1-methyl-pyrrolidinium bis(trifluoromethane sulfonyl) imide | 37 wt. % tetraglyme 37 wt. % 1-1-butyl-1-methyl-pyrrolidinium bis(trifluoromethane sulfonyl) imide | 37 wt. % tetraglyme 37 wt. % 1-1-butyl-1-methyl-pyrrolidinium bis(trifluoromethane sulfonyl) imide | 40-80 wt. % |
| Lithium Salt | 19% wt. % LiTFSI | 19 wt. % LiTFSI | 11 wt. % LiTFSI | 11 wt. % LiTFSI | 5-25 wt. % |
| SRA | 5.6 wt. % 4-methyl-benzyl alcohol | 6 wt. % 4-methyl-benzyl alcohol | 1 wt. % 4-methyl-benzyl alcohol | 1 wt. % 3-methoxy-benzyl alcohol | 0.5-10 wt. % |

In an embodiment, an electrochromic device may be formed by assembling two opposing electrodes with an electrolyte made of a polymer electrolyte formulation and SRA, and sealing them together. Specifically, individual electrode formation may be performed by applying a bus bar (e.g., silver) on a perimeter of the substrate (e.g., transparent conductor 102a covered surface of the lower glass plate 110) around the first electrode area in a vacuum chamber, and using a multi-drop technique to deposit a nanostructured transition layer bronze and/or metal oxide layer. A perimeter seal (e.g., glass or organic resin, for example, an epoxy) may be disposed above bus bar on the perimeter of the electrode. Subsequently, the polymer electrolyte formulation to which an SRA is added may be dispensed onto the electrode surface using a multi-drop technique. An opposing electrode, which may have been formed using a similar multi-drop technique within another vacuum chamber on a second substrate (e.g., the transparent conductor 102b covered surface of the upper glass plate 110), may be "sandwiched" onto the electrode, forming a sealed assembled electrochromic device.

Activation Phase

The activation phase of an SRA-based post-assembly charging process may involve applying a high bias to the electrochromic device created in the assembly phase to break up the SRA molecules and charge the device for the first time. Specifically, in various embodiments a large magnitude potential may be applied to the assembled device in order to initiate oxidation of the SRA at the first electrode (e.g., counter electrode/anode), generating electrons and protons. The electrons that are generated at the first electrode may then flow through an external circuit to reduce the second electrode (e.g., working electrode/cathode).

Figure 3:
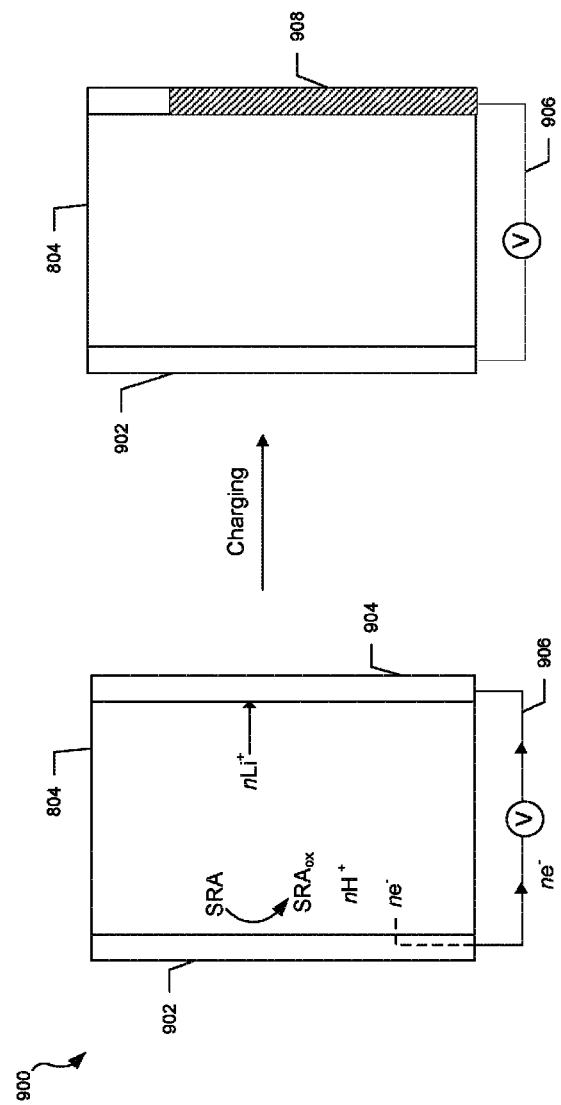
FIG. 3 is a schematic representation of an activation phase of an example a post-assembly charge generation process.

FIG. 3 illustrates the activation phase in an SRA-based post-assembly charging process to charge one electrode according to an embodiment. In the activation phase, a large magnitude potential bias that is outside of the typical device operating range (e.g., greater than or equal to around ±2V, such as greater than or equal to around ±3V) may be applied to an assembled electrochromic device 900 that is prepared in the assembly phase discussed above. Such potential may initiate the break-down of the SRA molecules in the electrolyte 804, thereby generating charge and charging the device. In particular, the SRA molecules near the interface of the first electrode 902 (e.g., the counter electrode/anode) may be oxidized to create an oxidized form of the SRA molecules, as well as "n" number of free protons and electrons, depending on the composition of the SRA. In various embodiments, oxidation of SRA molecules may additionally or alternatively cause other protic species to be generated, depending on the composition of the SRA.

The free protons generated from the SRA oxidation may diffuse into the electrolyte, and the free electrons may be pulled into the second electrode 904 (e.g., working electrode/cathode) through an external circuit 906 to reduce the second electrode 904. As a result, ions from the polymer electrolyte formulation (e.g., $Li^+$) may intercalate into the second electrode 904 for charge balance, thereby creating a charged second electrode 908. Subsequently, charge may be moved in typical device operation at a lower potential bias (e.g., less than around ±2 V). In some embodiments, an opposing bias may be applied at an appropriate potential following the charge generation in order to drive the device to its transparent state. In some embodiments, application of the large magnitude bias and opposing bias may be repeated multiple times to generate satisfactory charge density and switching speeds.

Figure 4A:
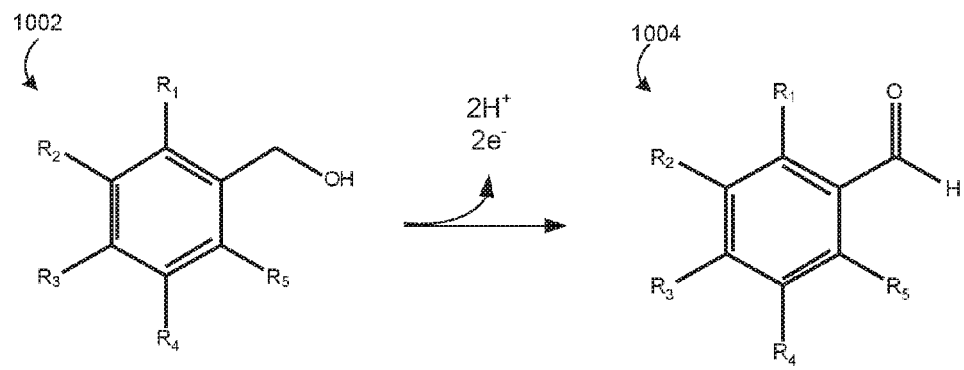
FIGS. 4A-4C are schematic equations showing the oxidation of molecules in example sacrificial redox agents (SRAs).
Figure 4B:
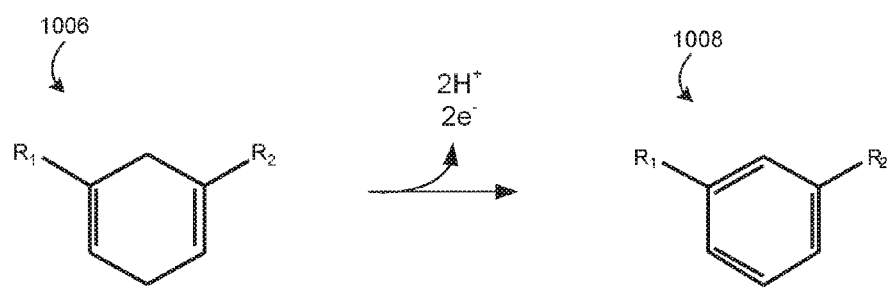
Figure 4C:
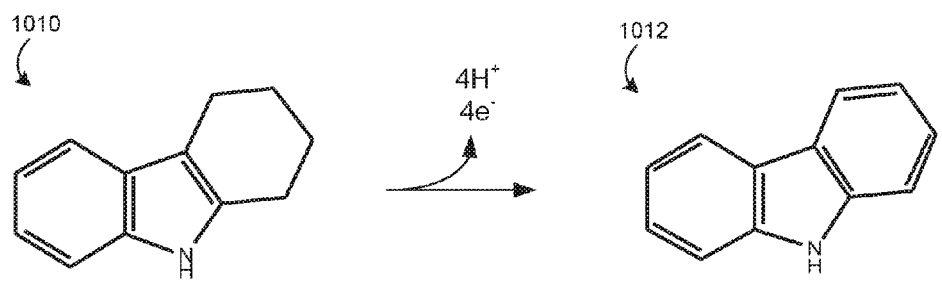

As discussed above, suitable SRAs that may be added to the polymer electrolyte formulation in the various embodiments include any of a variety of organic molecules that undergo electrochemical breakdown. In an embodiment, the electrochemical breakdown is an irreversible oxidation in which at least one electron and proton is generated. FIGS. 4A-4C are schematic equations showing the oxidations of example SRA molecule classes that may be used in various embodiments. For example, as shown in FIG. 4A, oxidation of a substituted benzyl alcohol SRA 1002 may produce two free protons and two free electrons, as well as a substituted benzaldehyde 1004 as the oxidized SRA compound. FIG. 4B shows that the oxidation of a substituted dimethyl cyclohexadiene SRA 1006 may produce two free protons and two free electrons, as well as a substituted dimethyl benzene 1008 as the oxidized SRA compound. In other example embodiments, oxidation of a nitrogen heterocycle may produce, in addition to free protons and free electrons, a carbazole as the oxidized SRA compound. For example, as shown in FIG. 4C, oxidation of a 1,2,3,4-tetrahydrocarbazole SRA 1010 may produce four electrons, four protons, and dibenzopyrrole 1012 as the oxidized SRA compound. In the examples shown in FIGS. 4A and 4B, groups R1-R5 may designate, for example, various substituents (e.g., $-OCH_3$, $-CH_3$, etc.), atoms (e.g., $-H$), other side-chains, and/or other various combinations thereof.

Post-assembly charging processes other than SRA-based embodiments may involve using a salt bridge to add charge to an assembled electrochromic device. In an embodiment, assembly of an electrochromic device may be performed by forming by assembling two opposing electrodes with an electrolyte, and sealing them together. Specifically, electrode formation may be performed by applying a busbar (e.g., made of silver) on a perimeter of the electrode area in a vacuum chamber, and using a multi-drop technique to deposit a nanostructured transition layer bronze and/or metal oxide layer. A perimeter seal (e.g., glass or organic resin, for example, an epoxy) may be disposed above busbar on the perimeter of the electrode. Subsequently, an electrolyte formulation may be dispensed onto the electrode surface using a multi-drop technique. An opposing electrode, which may have been formed using a similar multi-drop technique within another vacuum chamber, may be "sandwiched" onto the electrode, forming a sealed electrochromic device. Once assembled and sealed, a lithium bath may be prepared, for example, with bis(trifluoromethane)sulfonimide lithium salt forming a solution containing $Li^+$ and $TFSI^-$ ions. In various embodiments, a wire may provide an external circuit connecting the working electrode and the lithium bath, and a salt bridge may connect the lithium bath and the electrolyte. In some embodiments, the salt bridge may be formed using a glass tube or paper.

In various embodiments, electrons may be pulled from the anions in the lithium bath through the wire into the working electrode. As a result of the electron flow, lithium ions in the lithium bath may migrate via the salt bridge into the electrolyte to intercalate into the working electrode. Further, as a result of the electron flow, anions in the electrolyte (e.g., $TFSI^-$ ions) may migrate via the salt bridge out of the electrolyte to the lithium bath.

In another embodiment, post-assembly charging processes may involve using a lithium metal powder (e.g., stabilized lithium metal powder, such as SLMP® from FMC Lithium Energy). Specifically, in such embodiments an individual electrode may be placed in an inert chamber, and a solution of lithium metal powder in toluene solvent may be deposited across the electrode surface using a spray or slot coating deposition technique. After complete drying of the solvent, the electrode may be configured with a perimeter seal, and an electrolyte deposited on the electrode surface using a multi-drop technique. A complementary electrode may be "sandwiched" on top of the lithium metal coated electrode until a seal is formed, thereby fabricating an assembled electrochromic device containing neutral electrodes. In the various embodiments, a large magnitude potential (e.g., greater than or equal to around ±3V) may then be applied to the device in order to inject a desired amount of charge from the lithium metal powder coating into one of the electrodes. After completion of the charging, the device may be operated normally under a narrow potential window (e.g., less than around ±2V).

While the lithium layer was described above as being a lithium powder layer deposited in a toluene solvent, it should be noted that other alkali metal layers, such as non-powder lithium layers may be used instead. Furthermore, the lithium coated electrode may be the top electrode rather than the bottom electrode in the stack during fabrication of the cell.

Pre-Assembly Charging

Pre-assembly processes may involve charging the working or the counter electrode, or partially charging both working and counter electrodes, as determined to be most efficient based on the compositions of the electrodes. In particular, one or both electrodes may be intercalated by ions and/or reduced to create charge prior to assembly of the electrochromic device.

In various embodiments, a pre-charging assembly process may involve photoinjection of protons (PIH). In PIH processes, hydrogen containing molecules, such as hydrogen and oxygen containing molecules, may provide a source of protons to introduce charge into a transition metal oxide-containing electrode (e.g., a nanostructured tungsten bronze).

In particular, organic oxygen-containing molecules (e.g., aldehydes, alcohols, organic acids, etc.) may be provided, such as adsorbed, on the surface of the transition metal oxide-containing electrode, and the unshared electron pair of an oxygen atom of the adsorbed molecule may be pulled to a surface transition metal cation (e.g., $W^{6+}$) during the photoinjection of the proton into the electrode.

In various embodiments, the transition metal oxide-containing electrode may be exposed to UV radiation under nitrogen atmosphere conditions in order excite the oxide surface. Such excitation may be transferred to the oxygen atom of the adsorbed molecule causing bond rupture and detachment of protons, which may be photoinjected into the transition metal oxide structure of the electrode to provide charge. The extent of charging may be quantified using optical and electrochemical measurements. In the various embodiments, vapor concentration may be controlled and air exposure limited after charging to prevent loss of charge via air oxidation. Upon reaching satisfactory optical properties and charge capacities, the charged electrode may then be assembled with polymer electrolyte and another (charged or neutral) electrode into an electrochromic device.

In other embodiments, pre-assembly charging processes may include gas reduction of individual electrodes prior to assembly of the electrochromic device, similar to pre-lithiation of electrodes in lithium ion batteries. Specifically, an electrode containing metal oxide nanoparticles may be placed in an annealing furnace under an inert environment. A small percentage of hydrogen containing gas (e.g., hydrogen making up less than around 10 vol. % of the atmosphere), such as forming gas, may be introduced to the furnace chamber, initiating a chemical reduction of the metal oxide nanoparticles. The temperature for such gas reduction process may be around 200-500° C., depending on the composition of the electrode. In some embodiments, catalytically active nanocrystals, such as indium tin oxide, may be included in the electrode composition to reduce the temperature needed to initiate the hydrogen gas reduction process.

In some embodiments, optical transparency may be used to monitor the level of reduction. Once a desired level of reduction is achieved, the hydrogen gas flow may be stopped, with the electrode remaining in the inert chamber. Within the inert chamber, the electrode may be configured with a perimeter seal, and a multi-drop technique may be used to deposit an electrolyte on the electrode surface. In various embodiments, a complementary electrode may be sandwiched on top of the charged electrode until a seal is formed, thereby fabricating an electrochromic device with at least one charged electrode. The device may then be operated normally under a narrow potential window (e.g., less than around ±2 V).

While the various embodiments are described with respect to electrochromic windows, the embodiment methods, systems, and devices may also be used in materials for other types of smart windows. Such smart windows may include, but are not limited to, polymer-dispersed liquid crystals (PLDD), liquid crystal displays (LCDs), thermochromics, etc.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A method of forming an electrochromic device, comprising:
    providing a first electrode and a second electrode, wherein the first and second electrodes are neutrally-charged;
    assembling a sealed electrochemical cell of the electrochromic device containing the first and second electrodes and a solid state electrolyte disposed between the first and second electrodes; and
    generating a charge in at least one of the first and second electrodes after the assembling.

2. The method of claim 1, wherein:
    the solid state electrolyte comprises a polymer, at least one plasticizer, and a lithium salt; and
    the first electrode includes a nanostructured transition metal oxide bronze layer comprising one or more transition metal oxides and one or more dopant species.

3. The method of claim 2, wherein the polymer is selected from a group comprising poly(methyl methacrylate) (PMMA), poly(vinyl butyral-co-vinyl alcohol-co-vinyl acetate) (PVB), poly(ethylene oxide) (PEO), poly(vinylidene fluoride-co-hexafluoropropylene), poly(acrylonitrile) (PAN), and poly(vinyl alcohol) (PVA).

4. The method of claim 2, wherein the at least one plasticizer is selected from a group comprising tetraglyme, triglyme, diglyme, propylene carbonate, ethylene carbonate, 1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl) imide, etc.), and N,N-dimethylacetamide.

5. The method of claim 2, wherein the lithium salt is selected from a group comprising lithium bis(trifluoromethanesulfonyl) imide (LiTFSI), lithium perchlorate, and lithium hexafluorophosphate.

6. The method of claim 2, wherein:
    the solid state electrolyte further comprises a sacrificial redox agent (SRA); and
    generating the charge in at least one of the first and second electrodes comprises:
        applying an electrical bias to the electrochemical cell, wherein molecules of the SRA are oxidized near an interface with the first electrode, wherein the SRA oxidation releases protons and electrons;
        wherein the electrons generated from the oxidation of the SRA molecules are provided through a circuit between the first and the second electrodes to reduce the second electrode and wherein lithium ions from the electrolyte intercalate into the second electrode.

7. The method of claim 6, wherein the bias comprises a bias voltage with a magnitude greater than or equal to ±2 V.

8. The method of claim 6, wherein the SRA is selected from the group comprising substituted benzyl alcohols, nitrogen heterocycles, alkenes, and functionalized hydrobenzenes.

9. The method of claim 6, wherein the SRA is selected from the group comprising:
    4-methylbenzyl alcohol, 4-methoxybenzyl alcohol, dimethylbenzyl alcohol (3,5-dimethylbenzyl alcohol, 2,4-dimethylbenzyl, indoline, 1,2,3,4-tetrahydrocarbazole, N,N-dimethylaniline, and 2,5-dihydroanisole,
    wherein a concentration of the SRA is less than or equal to around 1.0 moles/liter (M) in the at least one plasticizer.

10. The method of claim 6, wherein the first electrode is an anode and the second electrode is a cathode.

11. The method of claim 2, further comprising forming at least one transparent conductor layer and at least one protective layer configured to reduce degradation of the nanostructured transition metal oxide bronze layer due to ultraviolet (UV) radiation.

12. The method of claim 11, wherein forming at least one protective layer comprises forming a film of an electrically insulating material that prevents or reduces electrons from the solid state electrolyte from interaction with the nanostructured transition metal oxide bronze layer,
    wherein the electrons are generated by exposure of the electrochromic device to ultraviolet (UV) radiation.

13. The method of claim 2, wherein:
    the first electrode further comprises transparent conducting oxide nanoparticles;
    the nanostructured transition metal oxide bronze layer selectively modulates transmittance of visible radiation and a first range of near-infrared (NIR) radiation as a function of a voltage applied to the device; and
    the transparent conducting oxide nanoparticles selectively modulate transmittance of a second range of NIR radiation as a function of the voltage applied to the device, wherein a portion of the second range overlaps with the first range.

14. The method of claim 13, wherein one or more dopant species in the transition metal oxide bronze layer comprise ions that cause a surface plasmon resonance effect on the one or more transition metal oxides by creating delocalized electron carriers, wherein the delocalized electron carriers selectively modulate transmittance of the first range of NIR radiation in response to a first operating voltage applied to the device.

15. The method of claim 14, wherein:
the first electrode further includes at least one nanostructured amorphous transition metal oxide selected from at least one of molybdenum oxide, titanium oxide, a vanadium oxide, or a niobium oxide, that selectively modulates transmittance of visible radiation to absorb shorter wavelength visible radiation than the visible radiation absorbed by the nanostructured transition metal oxide bronze layer; and
the at least one nanostructured amorphous transition metal oxide selectively modulates transmittance of a range of visible radiation having wavelengths of around 400-500 nm as a function of a voltage applied to the device.

16. The method of claim 14, wherein the dopant species ions that cause the surface plasmon resonance effect comprise at least one of cesium ions, cerium ions, rubidium ions, and lanthanum ions.

17. The method of claim 16, wherein:
at least one of the one or more dopant species further comprise intercalation ions, wherein the intercalation ions cause a change in the oxidation state of transition metal ions in the one or more transition metal oxides by intercalation into and deintercalation from the one or more transition metal oxides;
the change in the oxidation state selectively modulates transmittance of visible radiation in response to a second operating voltage applied to the device;
the second operating voltage has a larger magnitude than the first operating voltage;
the intercalation ions comprise at least one of sodium, potassium, and lithium ions which migrate between the solid state electrolyte layer and the nanostructured transition metal oxide bronze layer; and
the transparent conducting oxide nanoparticles comprise at least one of indium oxide based nanoparticles and zinc oxide based nanoparticles.

18. The method of claim 2, further comprising:
applying a bus bar on a perimeter of a first substrate around the first electrode area in a vacuum;
depositing the nanostructured transition metal oxide bronze layer on the first substrate using a multi-drop technique in a vacuum to form the first electrode;
forming a perimeter seal above the bus bar on the perimeter of the first electrode;
forming the electrolyte on the first electrode surface using the multi-drop technique;
forming the second electrode on a second substrate using the multi-drop technique in a vacuum; and
sealing the first substrate to the second substrate to complete the step of assembling the sealed electrochemical cell of the electrochromic device.

19. The method of claim 1, wherein generating a charge in at least one of the first and second electrodes comprises applying an electrical bias to the electrochemical cell such that charge is injected from a lithium layer in the device into the least one of the first and second electrodes.

20. The method of claim 19, further comprising depositing a solution of lithium metal powder in a solvent on a surface of the first electrode and drying solvent to form the lithium layer on the first electrode prior to the assembling.

21. The method of claim 1, wherein generating a charge in at least one of the first and second electrodes comprises providing electrons to the first electrode from a lithium salt bath electrically connected to the first electrode.

22. The method of claim 21, further comprising providing lithium ions from a lithium salt bath to the electrolyte through a salt bridge connecting the lithium salt bath and the solid state electrolyte, and providing bis(trifluoromethanesulfonyl) imide (TFSI) anions from the electrolyte to the salt bath through the salt bridge.

23. The method of claim 1, further comprising positioning the sealed electrochromic cell on a building or vehicle window.

24. A method of charging an electrochromic device, comprising:
providing an electrochemical cell of the electrochromic device containing first and second electrodes and a solid state electrolyte comprising a polymer and a sacrificial redox agent (SRA) disposed between the first and second electrodes; and
applying an electrical bias to the electrochemical cell, such that molecules of the SRA are oxidized near an interface with the first electrode to release protons and electrons, wherein the electrons generated from the oxidation of the SRA molecules are provided through a circuit between the first and the second electrodes to reduce the second electrode.

25. The method of claim 24, wherein:
lithium ions from the electrolyte intercalate into the second electrode in response to applying the bias; and
the SRA is selected from the group comprising substituted benzyl alcohols, nitrogen heterocycles, alkenes, and functionalized hydrobenzenes.

* * * * *